Figure 1:
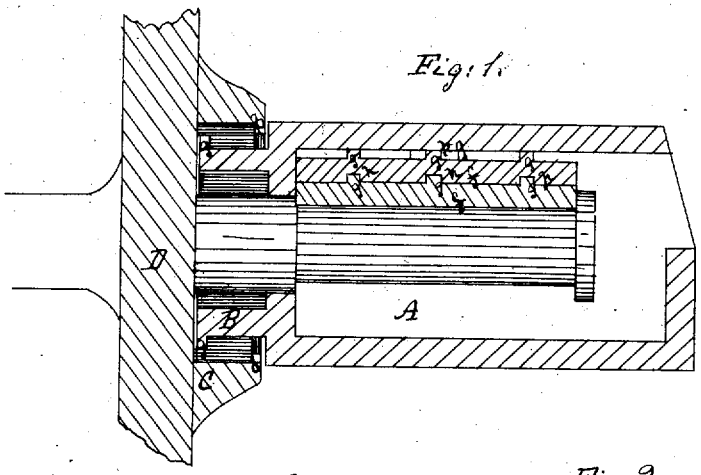
Figure 3:
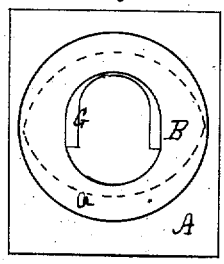
Figure 2:
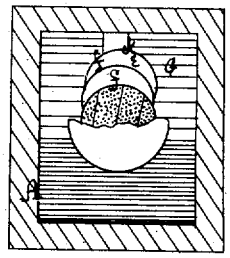

T. B. Stewart.

Car-Axle Box.

No. 3243 Reissued Dec. 22, 1868

Inventor

T. B. Stewart
by his attys
Gardiner & Hyde

Witnesses.
Louis C. Rodiop
R. F. Hyde

United States Patent Office.

T. B. STEWART, OF WETHERSFIELD, CONNECTICUT.

*Letters Patent No.* 71,241, *dated November* 19, 1867; *reissue No.* 3,243, *dated December* 22, 1868.

IMPROVED RAILROAD-CAR-AXLE BOX.

The Schedule referred to in these Letters Patent and making part of the same.

*To all whom it may concern:*

Be it known that I, T. B. STEWART, of Wethersfield, Hartford county, Connecticut, have invented a new and useful Improved "Journal-Box" for Car-Axles; and I do hereby declare that the following is a full and exact description thereof, reference being had to the accompanying drawings, and to the letters of reference marked thereon.

In the drawings—

Figure I is a sectional view of my improvement, and Figures II and III, detailed views of parts of the same.

The object of my improvement is to save the journals and boxes of car-axles as much as possible from wear, by preventing the dirt and dust outside from getting into the boxes and grinding between the bearings. I accomplish this by a peculiar form of box and car-wheel, which I will now describe.

Upon the side of the box A next the wheel is formed a cylindrical projection, B, having a flange, *a*, at its edge. This fits into a similar tubular projection, C, upon the wheel D, which also has a flange, *b*, upon its edge, this flange *b*, however, projecting toward the centre, while the one, *a*, on the tube B, radiates. The outside surface of the tube B is elliptical in shape, for a purpose hereafter described, so that a point on each side, at *e e'*, is flush with the outside edge of the flange *a*.

It will be seen in Fig. I that dust would have to pass around a very circuitous route before it could penetrate in far enough to reach the bearings of the journal.

The saddles of the bearing, I construct in a peculiar manner, so that they are easly adjusted in the boxes, and when two or more are fitted together, they form a solid bearing.

In Fig. II is shown an end view of the journal E and the saddles *f f*, with the box A.

The saddles *f f* are formed in the shape of crescents, having their outside surfaces of the same circular planes as their inside, so that they fit compactly one upon another.

In order to secure them from slipping, upon each outside surface, at the top, are tenons *g g g*, &c., which fit into corresponding cavities *h h h*, &c., on the inside surface.

These tenons *g g g* prevent also the whole combined saddle from moving in the box, as cavities may be sunk in the top of the same, for the upper outside tenons to fit into.

In Fig. I the centre tenon is shown fitting into a cavity, *k*, while the two end ones form rests on each side of the socket G having the cavity.

The tube B is formed elliptical, in order to allow the same to be moved up in the tube C when the saddles are being adjusted above the journal.

By means of this device I obtain a completely-protected box, no dust being allowed to enter, thereby saving much wear to both journal and saddles, while the latter, by their construction, are more perfect of operation and wear.

Now, having described my invention,

What I claim as new, and desire to secure by Letters Patent, is—

1. The combination and arrangement of the oblong tube B on the box, and the tube C on the wheel, with or without the flanges *a* and *b*, substantially as shown and described.

2. The crescent-shaped saddles *f*, having tenons *g g g* upon their outer surfaces, and cavities *h h h* on their inner surfaces, arranged substantially as shown.

T. B. STEWART.

Witnesses:

EDWARD H. HYDE,

R. F. HYDE.